US011994683B2

(12) United States Patent
Marsh et al.

(10) Patent No.: US 11,994,683 B2
(45) Date of Patent: May 28, 2024

(54) MIXED REALITY EYEWEAR WITH DEFORMABLE BEAM COMBINER

(71) Applicant: Innovega, Inc., Bellevue, WA (US)

(72) Inventors: Jay P. Marsh, Bonsall, CA (US); Jerome A. Legerton, Jupiter, FL (US)

(73) Assignee: Innovega, Inc., Bellevue, WA (US)

( * ) Notice: Subject to any disclaimer, the term of this patent is extended or adjusted under 35 U.S.C. 154(b) by 0 days.

(21) Appl. No.: 17/839,239

(22) Filed: Jun. 13, 2022

(65) Prior Publication Data
US 2023/0400690 A1 Dec. 14, 2023

(51) Int. Cl.
| | |
|---|---|
| *G02B 27/01* | (2006.01) |
| *G02B 27/10* | (2006.01) |
| *G02B 27/28* | (2006.01) |
| *G02C 7/04* | (2006.01) |
| *G02C 7/08* | (2006.01) |
| *G02C 7/12* | (2006.01) |

(52) U.S. Cl.
CPC ..... *G02B 27/0172* (2013.01); *G02B 27/0176* (2013.01); *G02B 27/1006* (2013.01); *G02B 27/286* (2013.01); *G02C 7/04* (2013.01); *G02C 7/086* (2013.01); *G02C 7/12* (2013.01); *G02B 2027/0178* (2013.01); *G02C 2202/20* (2013.01)

(58) Field of Classification Search
CPC ............ G02B 27/0172; G02B 27/0176; G02B 27/1006; G02B 27/286; G02B 2027/0178; G02C 7/04; G02C 7/086; G02C 7/12; G02C 2202/20
See application file for complete search history.

(56) References Cited

U.S. PATENT DOCUMENTS

| | | | |
|---|---|---|---|
| 8,520,309 B2 | 8/2013 | Sprague | |
| 2006/0098293 A1* | 5/2006 | Garoutte | G02B 27/0172 359/630 |
| 2015/0016777 A1* | 1/2015 | Abovitz | G02B 27/0093 385/37 |
| 2016/0252758 A1* | 9/2016 | Lee | G02B 27/0101 348/135 |
| 2022/0326468 A1* | 10/2022 | Lee | G02B 5/1823 |

OTHER PUBLICATIONS

Sprague et al., "Full field-of-view augmented reality using contact lenses", Interservice/Industry Training, Simulation, and Education Conference, 2010, Paper No. 10143, 11 pages.
PCT International Search Report and the Written Opinion dated Jul. 25, 2023, issued in related International Application No. PCT/US2023/025090 (9 pages).

* cited by examiner

*Primary Examiner* — Sahlu Okebato
(74) *Attorney, Agent, or Firm* — Sheppard Mullin Richter & Hampton LLP

(57) ABSTRACT

In general, one aspect disclosed features a mixed reality eyewear, comprising: a frame configured to be worn by a wearer; a lens attached to the frame and aligned with an eye of the wearer; a display panel attached to the frame and configured to render an image not aligned with an eye of the wearer; and a deformable beam combiner attached to the frame between the lens and an eye of the wearer and configured to reflect the rendered image toward the eye of the wearer.

20 Claims, 7 Drawing Sheets

MIXED REALITY EYEWEAR WITH DEFORMABLE BEAM COMBINER

DESCRIPTION OF RELATED ART

The disclosed technology relates generally to mixed reality and augmented reality, and more particularly some embodiments relate to eyewear for mixed reality and augmented reality.

SUMMARY

In general, one aspect disclosed features mixed reality eyewear, comprising: a frame configured to be worn by a wearer; a lens attached to the frame and aligned with an eye of the wearer; a display panel attached to the frame and configured to render an image not aligned with an eye of the wearer; and a deformable beam combiner attached to the frame between the lens and an eye of the wearer and configured to reflect the rendered image toward the eye of the wearer.

Embodiments of the mixed reality eyewear may include one or more of the following features. In some embodiments, the deformable beam combiner is a transparent polymer film. In some embodiments, the deformable beam combiner is polarizing such that a reflection of the rendered image is polarized. In some embodiments, the deformable beam combiner comprises: a reflective linear polarizer on an incident surface of the deformable beam combiner such that the reflection of the rendered image is linearly polarized. In some embodiments, the deformable beam combiner is a broadband reflector on an incident surface of the deformable beam combiner. In some embodiments, the polarizer is a broadband reflector on the back surface of a quarter waveplate retarder such that the reflection of a linear polarized rendered image is linearly polarized at an alternate angle. Some embodiments comprise a polarizer disposed between the display panel and the deformable beam combiner. In some embodiments, the deformable beam combiner comprises: a deformable reflective film; and one or more wires attached to the deformable reflective film configured to tension the film into a flat surface, and attached to the frame at an attachment point. In some embodiments, the one or more wires is metal. In some embodiments, the one or more wires is plastic. In some embodiments, the one or more wires is a composite. In some embodiments, the attachment point is fixed with respect to the frame. In some embodiments, the attachment point is movable with respect to the frame.

In general, one aspect disclosed features a mixed reality eyewear system, comprising: a contact lens configured to be worn by a wearer, the contact lens comprising: a central portion having a first polarization, and an outer portion surrounding the central portion and having a second polarization, wherein the second polarization is different from the first polarization; and mixed reality eyewear, comprising: a frame configured to be worn by the wearer; a lens attached to the frame and aligned with an eye of the wearer, wherein the lens has the second polarization; a display panel attached to the frame and configured to produce an image not aligned with an eye of the wearer; a deformable beam combiner attached to the frame between the lens and an eye of the wearer and configured to reflect the rendered image toward the eye of the wearer; and a polarizer disposed between the display panel and the deformable beam combiner, wherein the polarizer is configured to polarize the light representing the rendered image with the first polarization. In some embodiments, the contact lens is rotationally stable.

In general, one aspect disclosed features a mixed reality eyewear system, comprising: a contact lens configured to be worn by a wearer, the contact lens comprising: a central portion having a first polarization, and an outer portion surrounding the central portion and having a second polarization, wherein the second polarization is different from the first polarization; and mixed reality eyewear, comprising: a frame configured to be worn by the wearer; a lens attached to the frame and aligned with an eye of the wearer, wherein the lens has the second polarization; a display panel attached to the frame and configured to render an image not aligned with an eye of the wearer; and a deformable beam combiner attached to the frame between the lens and an eye of the wearer and configured to reflect the rendered image toward the eye of the wearer, wherein the deformable beam combiner is polarizing such that a reflection of the rendered image is polarized with the first polarization. In some embodiments, the contact lens is rotationally stable.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The FIGURES are not exhaustive and do not limit the present disclosure to the precise form disclosed.

DETAILED DESCRIPTION

Display eyewear are utilized for a plurality of applications. Some display eyewear is adapted for mixed reality or augmented reality. In mixed reality, the virtual content is not registered to the real world, resulting in a perceptible divergence between the two. In augmented reality, the virtual content is registered to the real world so the two meld seamlessly. Thus augmented reality may be considered a subset of mixed reality.

Current mixed and augmented reality eyewear utilize multiple different techniques such as waveguides, bird-bath optics, and off axis projection, and the like, but suffer from a number of shortcomings. Waveguides produce optical noise, scattering, and undesired diffraction and reflection. Birdbath optical systems produce spherical aberration, chromatic aberration and distortion when the user's gaze is off axis. Off axis projection is known to produce speckle that is difficult to manage in the transflective diffuser that must be placed in the spectacle plane and is fairly limited in Field of View. All techniques require large and heavy mechanisms, resulting in bulky and uncomfortable eyewear. The resulting eyewear form factors present a danger to the eyes. For example, in the case of a frontal impact, the rigid waveguides and birdbath optics may be forced against the eyes, possibly resulting in injury to the eyes.

Embodiments of the disclosure provide mixed reality and augmented reality eyewear with deformable beam combiners. In embodiments of the disclosure, mixed reality content is rendered on a horizontal display located above the eyes, and is reflected to the eye by a deformable beam combiner. Being deformable, the beam combiner, if pressed against the eye, deforms to accommodate the eye. The resulting eyewear is safe to use, even in the event of a frontal impact.

The disclosed augmented or mixed reality eyewear is not only safe, but also lightweight and compact. The deformable beam combiners are very light, and add little weight to the eyewear. The deformable beam combiners are also very small, and being very safe, may be placed close to the eyes, resulting in a large field of view compared with current solutions.

Figure 1:
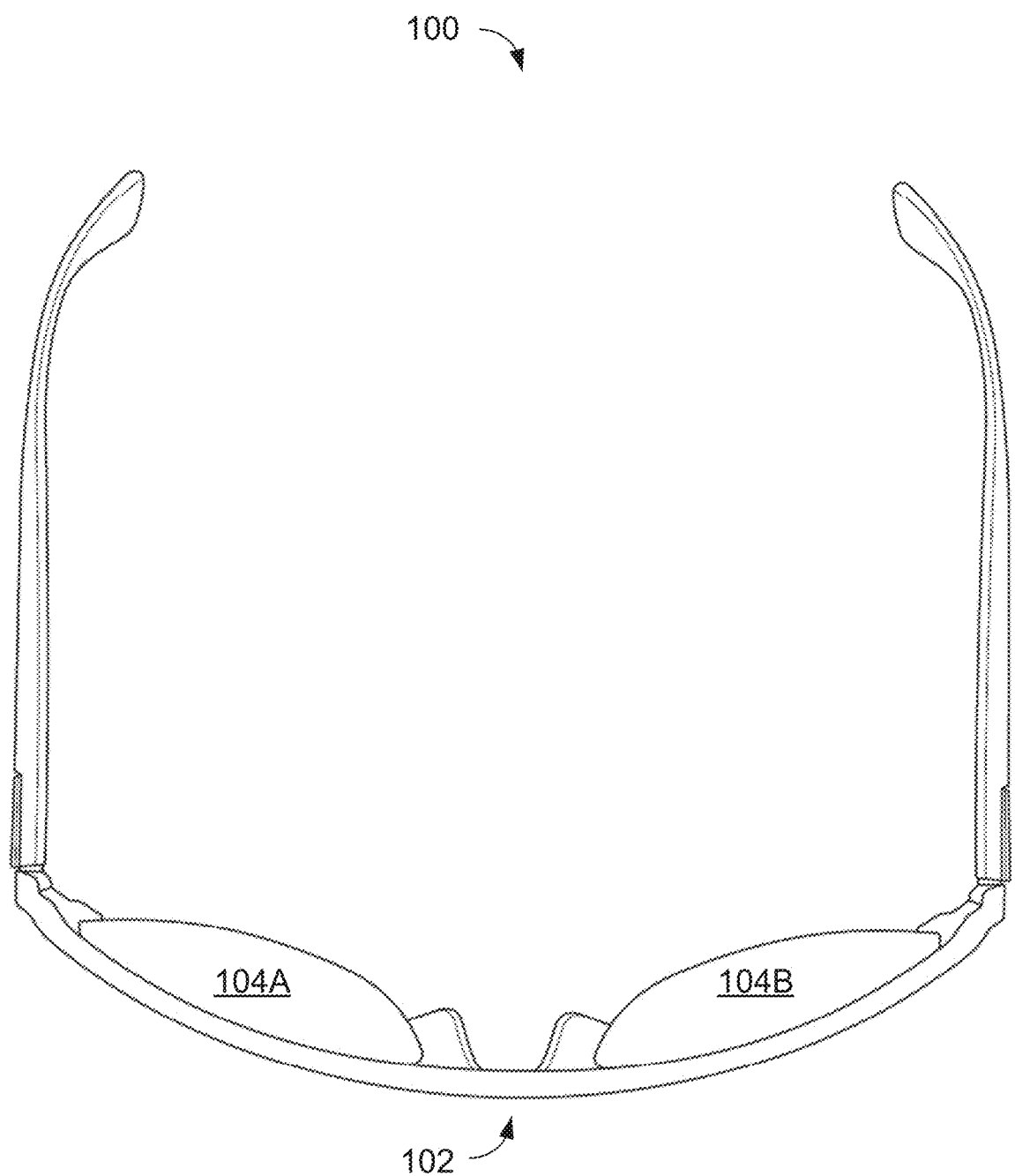
FIG. 1 is a top view of a portion of a mixed reality eyewear according to some embodiments of the disclosed technologies.

FIG. 1 is a top view of a portion of a mixed reality eyewear 100 according to some embodiments of the disclosed technologies. Referring to FIG. 1, the eyewear 100 includes a frame 102 and two deformable beam combiners 104A,B. The eyewear 100 may also include lenses, displays, and other features (not shown), as described elsewhere herein.

Figure 2A:
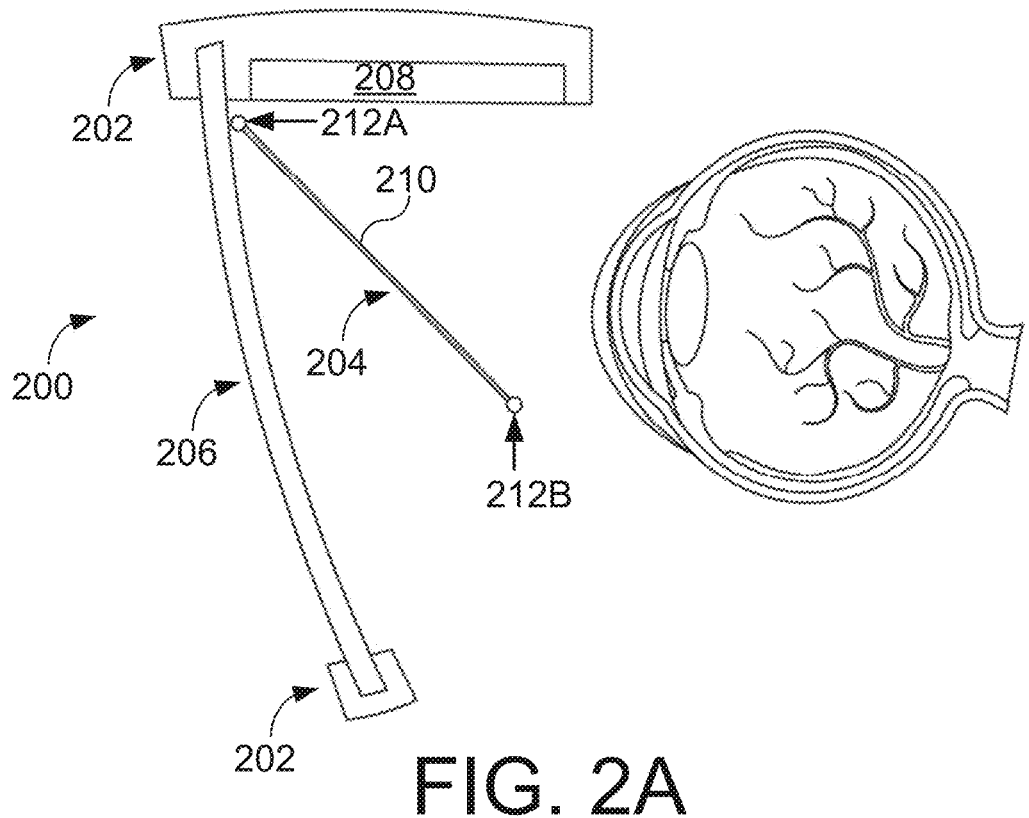
FIG. 2A is a cross-sectional side view of a mixed reality eyewear in a nominal state according to some embodiments of the disclosed technologies.

FIG. 2A is a cross-sectional side view of a mixed reality eyewear 200 in a nominal state according to some embodiments of the disclosed technologies. Referring to FIG. 2A, the eyewear 200 may include a frame 202, a deformable beam combiner 204, a lens 206, and a display panel 208. The frame 202 and lenses may be conventional eyewear frames and lenses. For example, the frame 202 may be implemented as the frame 102 of FIG. 1. Being in a nominal state, as normally worn, the deformable beam combiner 204 is not deformed. And being deformable, the deformable beam combiner 204 may be placed very close to the eye, as shown in FIG. 2A.

The disclosed deformable beam combiners may include a film and one or more wires to tension the film. Referring again to FIG. 2A, the deformable beam combiner 204 may include a film 210 and two wires 212A,B. In some embodiments, the film 210 may be a thin, clear, transparent film of polymer. In some embodiments, the film 210 may be made of Triacetate Cellulose (TAC), polyester (PET), Polyvinyl Alcohol (PVA), PETG (Polyethylene Terephthalate Glycol), PC (Polycarbonate), FEP and PFA (forms of Teflon), or ETFE (a close cousin to Teflon). However, other polymers with similar transmission and clarity features may be used. In embodiments where the deformable beam combiner 204 includes a polarizer, the film may be selected to accommodate the manufacturing process for the polarizer.

The thickness and/or modulus of elasticity of the film 210 may be selected to achieve a desired stiffness so the film is flexible while allowing the wires 212 to create the desired shape in the film 210. In some embodiments, the film 210 may be about 100 microns thick. In some embodiments, the film 210 may be thinner. For example, in some embodiments, the film 210 is about 25 microns thick or about 10 microns thick.

In some embodiments, the film 210 may be clear. In some embodiments, the film 210 may have some color distortion due to transmission and absorption characteristics and could be tailored to provide improved contrast ratio between real world and display light by attenuating the real world light in narrow wavelength bands that are similar to the display light emission spectrum.

Some polymer films can be manufactured as thicker films and then stretched to a final thickness. The stretching process can lead to significant included stress and polymer chain directionality, both of which are strong influences on birefringence for some polymers. In some embodiments, the film 210 material may be selected to be absent of any birefringence.

The wires 212A,B may be made of metal, plastic, or other suitable materials. The material must have suitable tensile and flexural modulus combined with high plastic yield strength to offer the combined features of supporting the film and being deformable with low applied forces.

The wires 212A,B may be attached to the film 210. For example, the upper wire 212A may be attached to an upper forward edge of the film 210, and the lower wire 212B may be attached to a lower back edge of the film 210. The wires 212A,B may be fixed to the film 210 or enclosed within an edge pocket of the film that allows the wire to move relative to the film 210. The wires 212A,B may be anchored to each other, or to the frame 202, or to a common anchor piece to provide the required shape to the film.

Each wire 212 or the anchor piece may be attached to the frame 202 at one or more attachment points. In some embodiments, an attachment point may be fixed with respect to the frame 202. In some embodiments, an attachment point may be movable with respect to the frame 202. Movable attachment points may be moved manually or automatically. For example, the eyewear 200 may include a motor controlled by a controller or processor to move the attachment point in accordance with computer-readable code stored on a non-transitory storage medium.

The display panel 208 may be implemented for example as an LCD, LCOS, or OLED display panel, or any display panel capable of carrying out the functionality described. The display panel 208 may be mounted horizontally above the lens 206 of the eyewear such that light produced by the display panel 208 is directed downward. One advantage of this orientation is that the display panel 208 blocks light from the sun or overhead lights from reaching the eye of the wearer. However, other orientations of the display panel 208 may be employed, so long as light produced by the display panel 208 is not aligned with the straight ahead gaze of an eye.

In some embodiments, the eyewear 200 may include a controller. The controller may provide images to the display panel 208. The controller may be located with the display panel 208, within the frame 202, and/or within some other portion of the eyewear 200, or may be tethered to the eyewear 200 by wire or wirelessly.

Figure 2B:
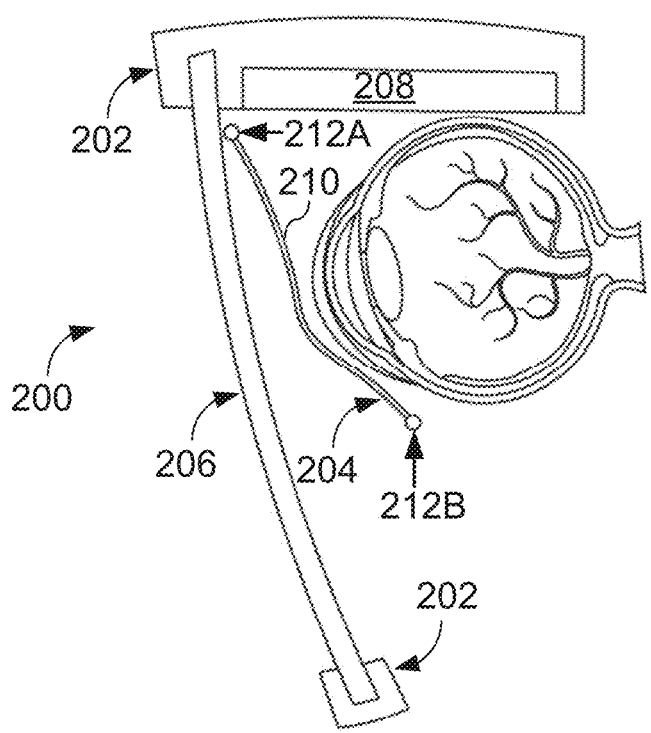
FIG. 2B is a cross-sectional side view of the mixed reality eyewear of FIG. 2A during a deformation event according to some embodiments of the disclosed technologies.

FIG. 2B is a cross-sectional side view of the mixed reality eyewear 200 of FIG. 2A during a deformation event according to some embodiments of the disclosed technologies. A deformation event may occur when the eye contacts the deformable beam combiner 204, for example as a result of a frontal impact to the eyewear 200. The force of the eye may deform the deformable beam combiner 204, for example as shown in FIG. 2B. The force of the eye may displace one or more of the wires 212, for example as shown in FIG. 2B. By absorbing the force of the eye with flexure of the wire, the deformable beam combiner 204 protects the eye.

Figure 3A:
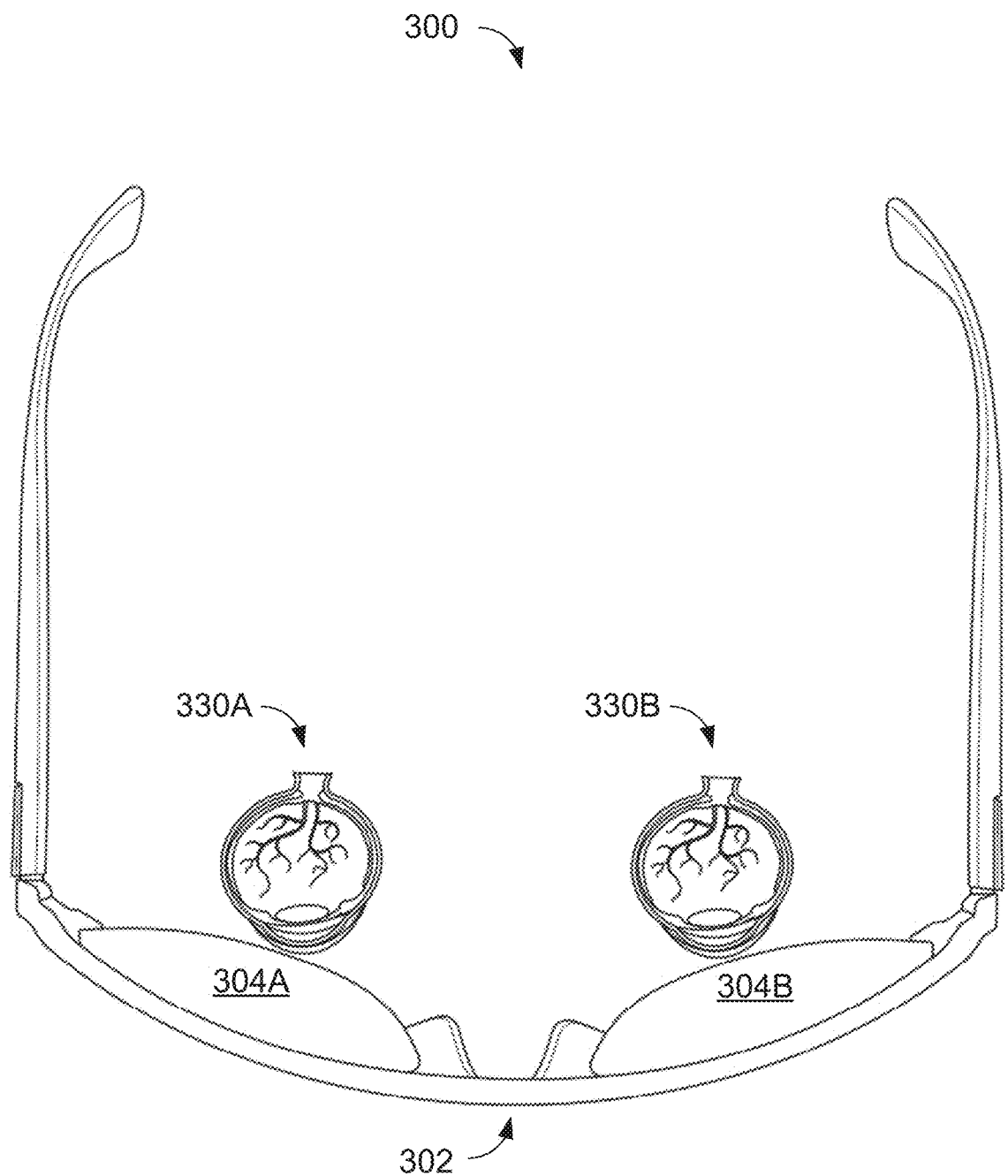
FIG. 3A is a top view of a mixed reality eyewear in a nominal state according to some embodiments of the disclosed technologies.

FIG. 3A is a top view of a mixed reality eyewear 300 in a nominal state according to some embodiments of the disclosed technologies. Referring to FIG. 3A, the eyewear 300 may include a frame 302 and two deformable beam combiners 304A,B. The eyewear 300 may also include lenses and displays (not shown), as described elsewhere herein. Being in a nominal state, as normally worn, the deformable beam combiners 304A,B are not deformed. And being deformable, the deformable beam combiners 304A,B may be placed very close to the eyes 330A,B, as shown in FIG. 3A.

Figure 3B:
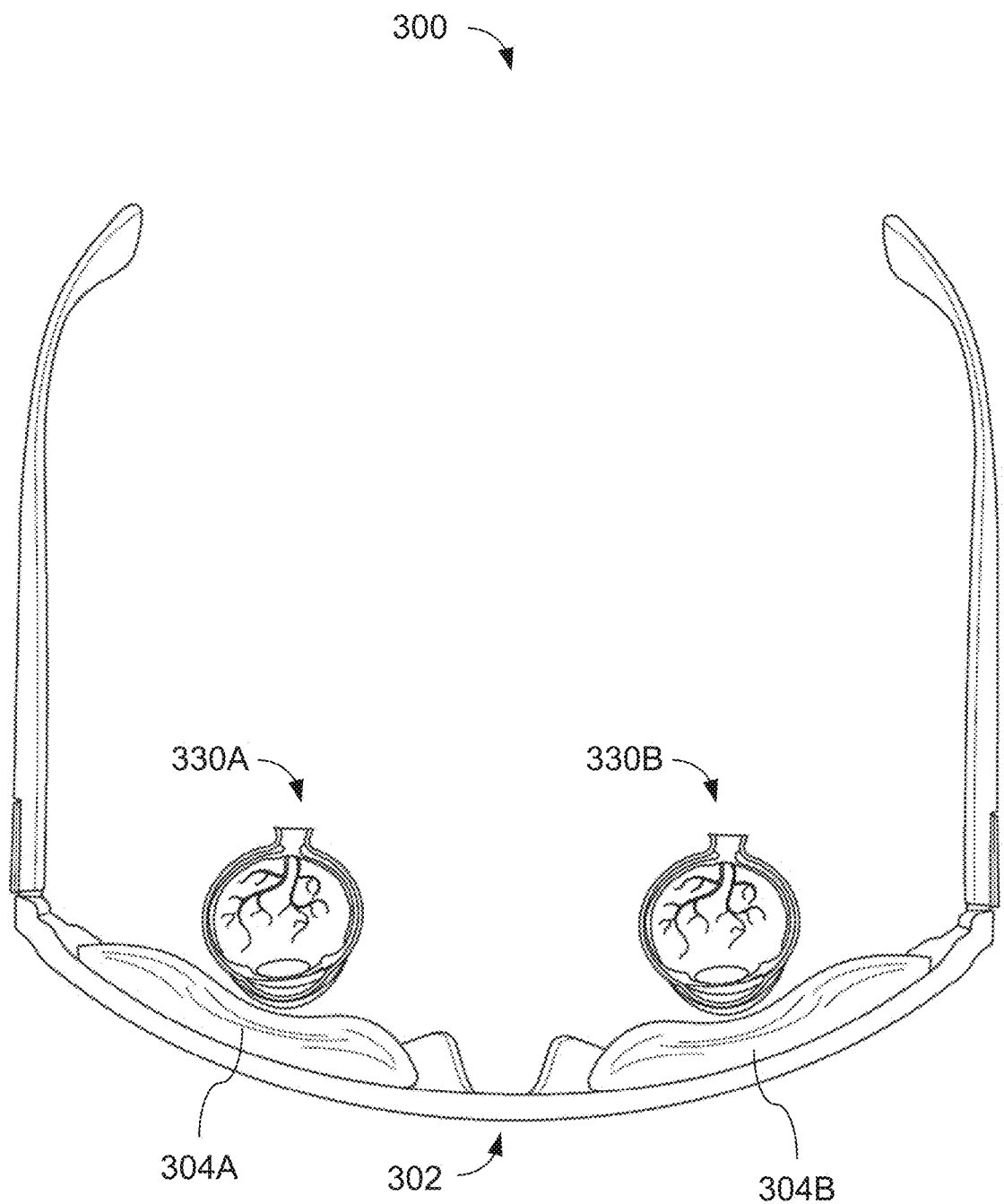
FIG. 3B is a top view of the mixed reality eyewear of FIG. 3A during a deformation event according to some embodiments of the disclosed technologies.

FIG. 3B is a top view of the mixed reality eyewear 300 of FIG. 3A during a deformation event according to some embodiments of the disclosed technologies. The force of the eye may deform the deformable beam combiners 304A,B, for example as shown in FIG. 3B.

Figure 4:
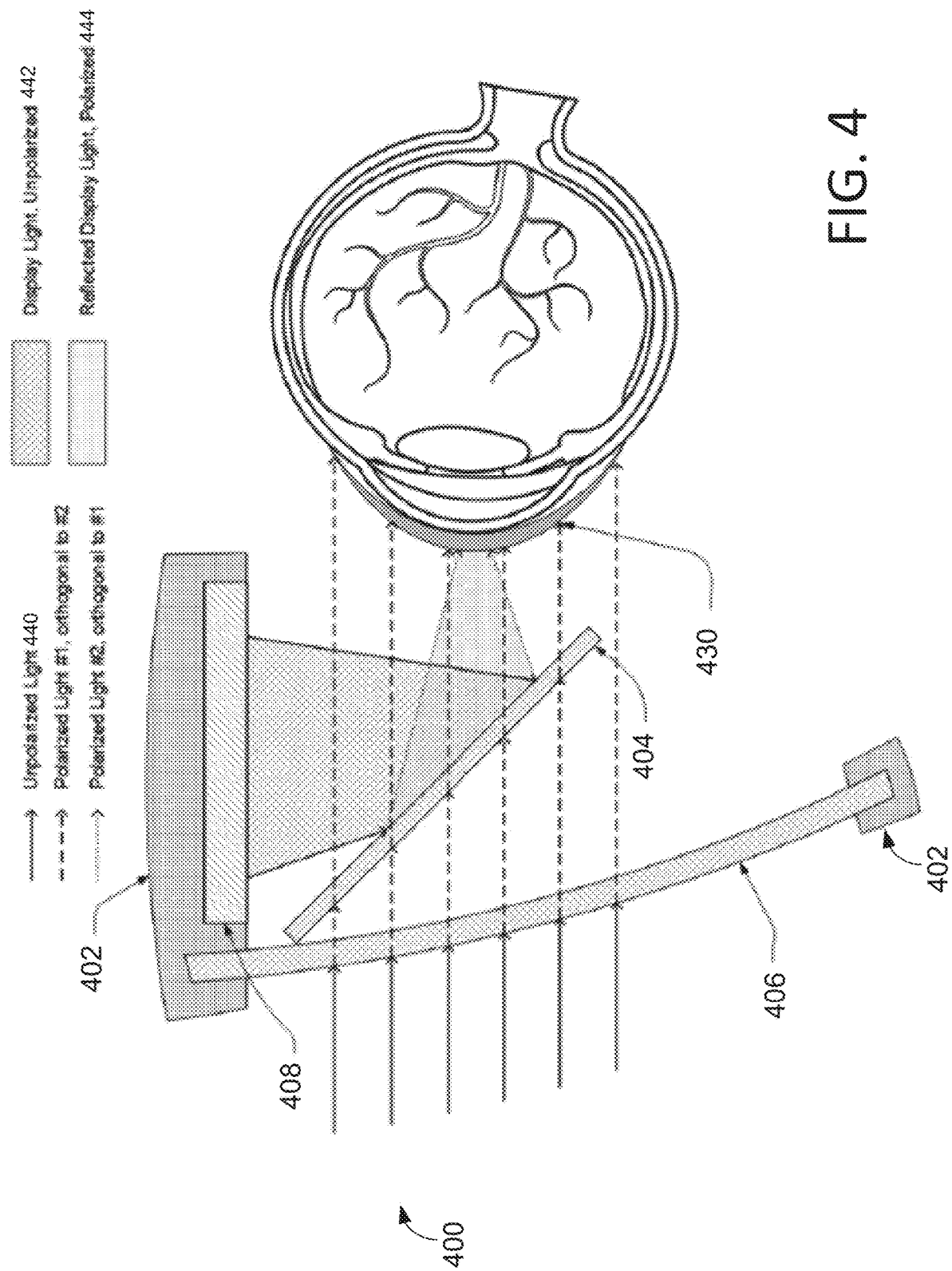
FIG. 4 is a cross-sectional side view of a mixed reality eyewear with a polarizing deformable beam combiner 404 according to some embodiments of the disclosed technologies.

In some embodiments, the deformable beam combiner may polarize the light produced by the display panel. FIG. 4 is a cross-sectional side view of a mixed reality eyewear 400 with a polarizing deformable beam combiner 404 according to some embodiments of the disclosed technologies. Referring to FIG. 4, the eyewear 400 may include a frame 402, a deformable beam combiner 404, a lens 406, and a display panel 408. The frame 402 and lenses may be conventional eyewear frames and lenses. For example, the frame 402 may be implemented as the frame 102 of FIG. 1. The deformable beam combiner 404 may be polarizing such that a reflection of light from the display panel 408 is polarized. In FIG. 4, the unpolarized light 442 produced by the display panel 408 is shown with a cross-hatch pattern. The polarized display light reflected by the deformable beam combiner 404 is shown with a dotted pattern, at 444.

In some embodiments, the deformable beam combiner 404 may include a reflective linear polarizer on an incident surface of the deformable beam combiner 404 such that the reflection of light from the display panel 408 is linearly polarized. In some embodiments, the deformable beam combiner may be a broadband reflector on the back surface of a quarter waveplate retarder such that the reflection of linear polarized light from the display panel 408 is linearly polarized at an alternate angle. When linearly polarized light passes through a quarter wave plate, it transforms to rotationally polarized at the exit side of the wave plate. But if there is a mirror at that surface, the rotationally polarized light changes its "handed-ness" as it reflects off the mirrored surface. This rotationally polarized light now makes a second pass through the wave plate and is returned to linearly polarized light again but at a different angle. The amount of angle rotation between the incoming and existing light is a function of the orientation of the quarter waveplate. A half wave plate is commonly used to rotate linearly polarized light to an alternate angle, as is well understood by those skilled in the art. Two quarter wave plates serve the same function as a single half wave plate. In some embodiments, the deformable beam combiner 404 may include a broadband reflector on the incident surface of the deformable beam combiner 404 and provide no polarization adjustment between the incident light and the reflected light.

In some embodiments, the lens 406 may be polarizing such that ambient unpolarized light 440 received by the lens 406 is polarized by the lens 406, as shown at #1. In some embodiments, the deformable beam combiner 404 may polarize reflected display light with a first orientation, and the lens 406 may polarize ambient light with a second orientation, where the first and second orientations are different. For example, the first and second orientations may be orthogonal. In some embodiments, the deformable beam combiner 404 may polarize reflected display light with a first orientation and filter ambient light to become polarized orthogonal to the reflected display light. These embodiments may be used advantageously with a contact lens having two polarizers and thereby produce two optical paths: one optical path defined by the ambient light having one polarization and the second optical path defined by the display light reflected off the deformable beam combiner having a second polarization that is orthogonal to the polarization of the ambient light optical path.

Figure 5:
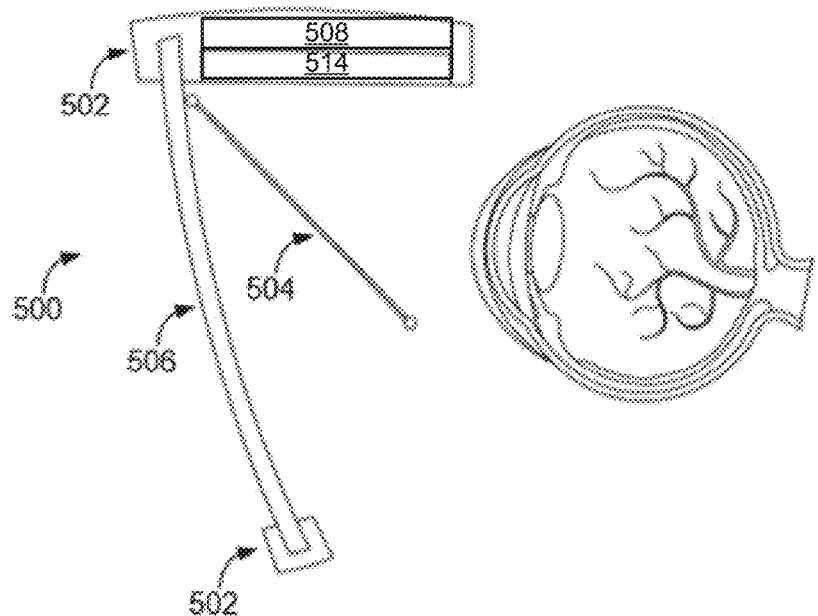
FIG. 5 is a cross-sectional side view of a mixed reality eyewear with a polarizer 514 according to some embodiments of the disclosed technologies.

In some embodiments, instead of having a polarizing deformable beam combiner, the eyewear may include a polarizer disposed between the display panel and the deformable beam combiner. FIG. 5 is a cross-sectional side view of a mixed reality eyewear 500 with a polarizer 514 according to some embodiments of the disclosed technologies. Referring to FIG. 5, the eyewear 500 may include a frame 502, a deformable beam combiner 504, a lens 506, a display panel 508, and the polarizer 514. The frame 502 and lenses may be conventional eyewear frames and lenses. For example, the frame 502 may be implemented as the frame 102 of FIG. 1. In these embodiments, light generated by the display panel 508 is polarized by the polarizer 514 before reaching the deformable beam combiner 504.

In some embodiments, the lens 506 may be polarizing such that ambient unpolarized light 524 received by the lens 506 is polarized by the lens 506. In some embodiments, the polarizer 514 may polarize light with a first orientation, and the lens 506 may polarize light with a second orientation, where the first and second orientations are different. For example, the first and second orientations may be orthogonal. These embodiments may be used advantageously with a contact lens having two polarizers.

Figure 6:
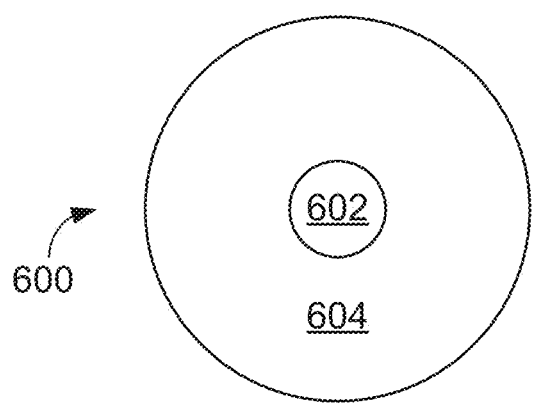
FIG. 6 illustrates a contact lens having two polarizers according to some embodiments of the disclosed technologies.

FIG. 6 illustrates a contact lens 600 having two polarizers according to some embodiments of the disclosed technologies. The contact lens 600 may include a central portion 602 having a first polarization, and an outer portion 604 surrounding the central portion 602 and having a second polarization, where the second polarization is different from the first polarization. For example, the first and second orientations may be orthogonal. The contact lens may be rotationally stable.

The contact lens 600 may be used with the polarizing eyewear 400 of FIG. 4, or the polarizing eyewear 500 of FIG. 5. In some embodiments, the polarization of the light reflected by the deformable beam combiner matches the polarization of the central portion 602 of the contact lens 600, and so is passed to the retina, while light from the lens of the eyewear is blocked by the central portion 602. In some embodiments, the polarization of the light from the lens of the eyewear matches the polarization of the outer portion 604 of the contact lens 600, and so is passed to the retina, while light reflected by the deformable beam combiner is blocked by the outer portion 604. Similar contact lenses are described in U.S. Pat. No. 8,520,309 to Randall B. Sprague, entitled "Method And Apparatus To Process Display And Non-Display Information", granted Aug. 27, 2013, the disclosure thereof incorporated by reference herein in its entirety.

Figure 7:
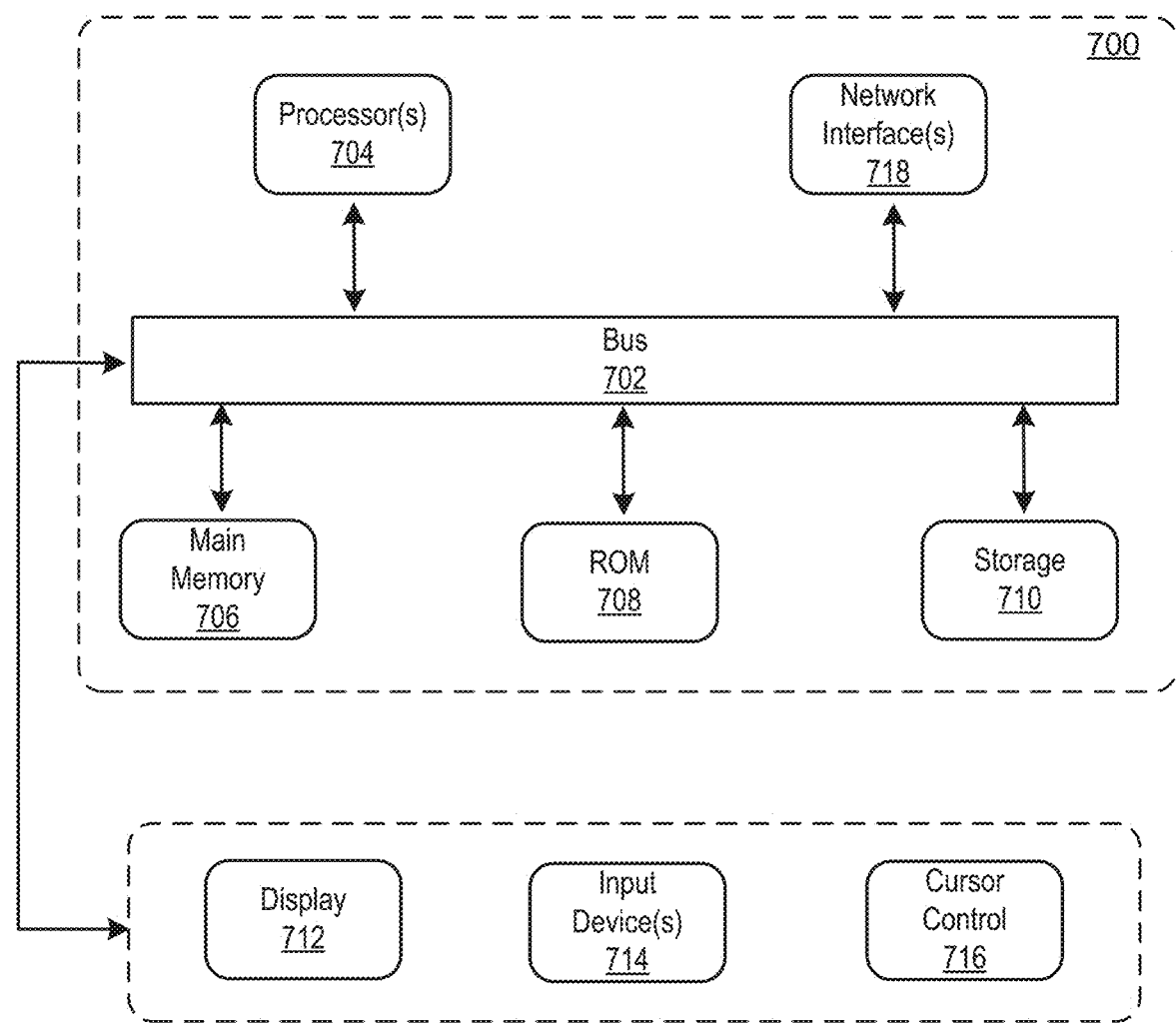
FIG. 7 is an example computing component that may be used to implement various features of embodiments described in the present disclosure.

FIG. 7 depicts a block diagram of an example computer system 700 in which embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or a WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. Mixed reality eyewear, comprising:
   a frame configured to be worn by a wearer;
   a lens attached to the frame and aligned with an eye of the wearer;
   a display panel attached to the frame and configured to render an image, wherein light produced by the display panel is not aligned with a straight ahead gaze of an eye of the wearer; and
   a deformable beam combiner attached to the frame between the lens and an eye of the wearer and configured to reflect the rendered image toward the eye of the wearer, wherein the deformable beam combiner comprises:
   a deformable reflective film, and
   one or more wires attached to the deformable reflective film configured to tension the film into a flat surface, and attached to the frame at an attachment point.

2. The mixed reality eyewear of claim 1, wherein the deformable beam combiner further comprises:
   a transparent polymer film.

3. The mixed reality eyewear of claim 2, wherein:
   the deformable beam combiner is polarizing such that a reflection of the rendered image is polarized.

4. The mixed reality eyewear of claim 1, wherein the deformable beam combiner further comprises:
   a reflective linear polarizer on an incident surface of the deformable beam combiner such that the reflection of the rendered image is linearly polarized.

5. The mixed reality eyewear of claim 1, wherein the deformable beam combiner further comprises:
   a broadband reflector on an incident surface of the deformable beam combiner.

6. The mixed reality eyewear of claim 4, wherein:
   the polarizer is a broadband reflector on the back surface of a quarter waveplate retarder such that the reflection of a linear polarized rendered image is linearly polarized at an alternate angle.

7. The mixed reality eyewear of claim 1, further comprising:

a polarizer disposed between the display panel and the deformable beam combiner.

8. The mixed reality eyewear of claim 1, wherein:
the one or more wires are metal.

9. The mixed reality eyewear of claim 1, wherein:
the one or more wires are plastic.

10. The mixed reality eyewear of claim 1, wherein:
the one or more wires are composite.

11. The mixed reality eyewear of claim 1, wherein:
the attachment point is fixed with respect to the frame.

12. The mixed reality eyewear of claim 1, wherein:
the attachment point is movable with respect to the frame.

13. A system, comprising:
a contact lens configured to be worn by a wearer, the contact lens comprising:
   a central portion having a first polarization, and
   an outer portion surrounding the central portion and having a second polarization, wherein the second polarization is different from the first polarization; and
mixed reality eyewear, comprising:
   a frame configured to be worn by the wearer;
   a lens attached to the frame and aligned with an eye of the wearer, wherein the lens has the second polarization;
   a display panel attached to the frame and configured to render light representing an image, wherein light rendered by the display panel is not aligned with a straight ahead gaze of an eye of the wearer;
   a deformable beam combiner attached to the frame between the lens and an eye of the wearer and configured to reflect the rendered image toward the eye of the wearer, wherein the deformable beam combiner comprises:
      a deformable reflective film, and
      one or more wires attached to the deformable reflective film configured to tension the film into a flat surface, and attached to the frame at an attachment point; and
   a polarizer disposed between the display panel and the deformable beam combiner, wherein the polarizer is configured to polarize the light representing the rendered image with the first polarization.

14. The system of claim 13, wherein:
the contact lens is rotationally stable.

15. A system, comprising:
a contact lens configured to be worn by a wearer, the contact lens comprising:
   a central portion having a first polarization, and
   an outer portion surrounding the central portion and having a second polarization, wherein the second polarization is different from the first polarization; and
mixed reality eyewear, comprising:
   a frame configured to be worn by the wearer;
   a lens attached to the frame and aligned with an eye of the wearer, wherein the lens has the second polarization;
   a display panel attached to the frame and configured to render an image, wherein light produced by the display panel is not aligned with a straight ahead gaze of an eye of the wearer; and
   a deformable beam combiner attached to the frame between the lens and an eye of the wearer and configured to reflect the rendered image toward the eye of the wearer, wherein the deformable beam combiner is polarizing such that a reflection of the rendered image is polarized with the first polarization, and wherein the deformable beam combiner comprises:
      a deformable reflective film, and
      one or more wires attached to the deformable reflective film configured to tension the film into a flat surface, and attached to the frame at an attachment point.

16. The system of claim 15, wherein:
the contact lens is rotationally stable.

17. The system of claim 13, wherein the deformable beam combiner further comprises:
a transparent polymer film.

18. The system of claim 17, wherein:
the deformable beam combiner is polarizing such that a reflection of the rendered image is polarized.

19. The system of claim 15, wherein the deformable beam combiner further comprises:
a transparent polymer film.

20. The system of claim 19, wherein:
the deformable beam combiner is polarizing such that a reflection of the rendered image is polarized.

* * * * *